(12) United States Patent
Davis et al.

(10) Patent No.: US 10,202,863 B2
(45) Date of Patent: Feb. 12, 2019

(54) SEAL RING FOR GAS TURBINE ENGINES

(71) Applicant: United Technologies Corporation, Farmington, CT (US)

(72) Inventors: Timothy M. Davis, Kennebunk, ME (US); Mark F. Zelesky, Bolton, CT (US); Michael G. McCaffrey, Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 269 days.

(21) Appl. No.: 15/162,069

(22) Filed: May 23, 2016

(65) Prior Publication Data

US 2017/0335704 A1 Nov. 23, 2017

(51) Int. Cl.
- *F01D 11/00* (2006.01)
- *F16J 15/02* (2006.01)
- *F16J 15/44* (2006.01)
- *F01D 11/08* (2006.01)

(52) U.S. Cl.
CPC .......... *F01D 11/005* (2013.01); *F01D 11/003* (2013.01); *F01D 11/08* (2013.01); *F16J 15/02* (2013.01); *F16J 15/024* (2013.01); *F16J 15/44* (2013.01); *F05D 2220/32* (2013.01); *F05D 2240/15* (2013.01); *F05D 2240/55* (2013.01); *F05D 2250/75* (2013.01)

(58) Field of Classification Search
CPC ...... F16J 2015/0837; F16J 15/02; F16J 15/44; F02F 11/002; F05D 2250/75; F05D 2240/11; F01D 11/005; F01D 11/003; F01D 11/08
See application file for complete search history.

(56) References Cited

U.S. PATENT DOCUMENTS

| | | | | |
|---|---|---|---|---|
| 3,272,521 A | * | 9/1966 | McNenny | F16J 15/3236 277/467 |
| 3,501,868 A | * | 3/1970 | Ganzinotti | A01G 25/00 277/646 |
| 4,602,795 A | * | 7/1986 | Lillibridge | F16J 15/0887 277/644 |
| 4,602,888 A | * | 7/1986 | Court | F16J 15/0887 267/1.5 |
| 4,759,555 A | * | 7/1988 | Halling | F16J 9/18 277/631 |
| 4,798,392 A | * | 1/1989 | Tozer | F16J 15/0887 277/644 |
| 5,630,593 A | * | 5/1997 | Swensen | F16J 15/0887 277/626 |
| 6,076,835 A | | 6/2000 | Ress et al. | |
| 6,237,921 B1 | | 5/2001 | Liotta et al. | |

(Continued)

FOREIGN PATENT DOCUMENTS

| | | |
|---|---|---|
| EP | 1177367 B1 | 8/2003 |
| GB | 597699 | 2/1948 |
| JP | 2015206462 A | 11/2015 |

OTHER PUBLICATIONS

Extended European Search Report for EP Application No. 17172486.7, dated Oct. 25, 2017, 10 pages.

*Primary Examiner* — Eugene G Byrd
(74) *Attorney, Agent, or Firm* — Kinney & Lange, P.A.

(57) ABSTRACT

An annular ring for sealing a flow includes an inner ring and a tab. The tab extends radially and is configured to restrict axial movement of the seal.

15 Claims, 7 Drawing Sheets

(56) References Cited

U.S. PATENT DOCUMENTS

| | | | |
|---|---|---|---|
| 6,352,267 B1 * | 3/2002 | Rode | F16J 15/0887 277/631 |
| 6,612,809 B2 | 9/2003 | Czachor et al. | |
| 6,733,234 B2 * | 5/2004 | Paprotna | F01D 11/005 277/637 |
| 7,090,459 B2 * | 8/2006 | Bhate | F01D 11/025 277/581 |
| 7,121,790 B2 | 10/2006 | Fokine et al. | |
| 7,152,864 B2 * | 12/2006 | Amos | F01D 11/005 277/650 |
| 7,372,933 B2 * | 5/2008 | Ohsono | F16J 15/0893 277/314 |
| 7,497,443 B1 | 3/2009 | Steinetz | F16J 15/0887 277/644 |
| 8,192,149 B2 | 6/2012 | Audeon et al. | |
| 8,651,497 B2 * | 2/2014 | Tholen | F01D 11/005 277/644 |
| 8,814,173 B2 | 8/2014 | Motzkus et al. | |
| 8,827,642 B2 | 9/2014 | Walunj et al. | |
| 9,103,225 B2 * | 8/2015 | Lutjen | F01D 11/08 |
| 9,169,930 B2 * | 10/2015 | Panchal | F16J 15/3284 |
| 2005/0118016 A1 | 6/2005 | Fokine et al. | |
| 2005/0260066 A1 | 11/2005 | Lejars et al. | |
| 2006/0082074 A1 | 4/2006 | Synnott et al. | |
| 2009/0191050 A1 | 7/2009 | Nereim et al. | |
| 2009/0243228 A1 * | 10/2009 | Heinemann | F01D 11/005 277/595 |
| 2011/0150635 A1 | 6/2011 | Motzkus et al. | |
| 2013/0266416 A1 * | 10/2013 | Bergman | F01D 25/246 415/1 |
| 2014/0250893 A1 | 9/2014 | Chan et al. | |
| 2014/0286751 A1 * | 9/2014 | Brunelli | F01D 11/24 415/116 |
| 2015/0076390 A1 | 3/2015 | Kloeppner et al. | |
| 2015/0226132 A1 | 8/2015 | Thill et al. | |
| 2016/0003080 A1 | 1/2016 | Megarrah | |
| 2016/0040547 A1 | 2/2016 | Clouse et al. | |
| 2016/0084099 A1 | 3/2016 | Davis et al. | |
| 2016/0115807 A1 | 4/2016 | Davis et al. | |

* cited by examiner

SEAL RING FOR GAS TURBINE ENGINES

BACKGROUND

The present invention relates generally to seals, and more particularly to annular seals suitable for use in gas turbine engines.

Annular seals are used in many applications, such as in pistons of combustion engines, in piping fittings, and in gas turbine engines. Annular seals are often used in gas turbine engines between components, such as vanes and blade outer air seals, to keep operating gasses and cooling gasses separate.

W-seals are a type of seal capable of withstanding high pressures and are designed to expand and contract axially and circumferentially, allowing w-seals to seal cavities between components of gas turbine engines subjected to a variety of conditions. However, w-seals have been known to degrade from exposure to high temperatures as well as wear and stress from significant relative motion. Heat shields and wear shield have been used to reduce high temperature exposure and wear to w-seals. However, some heat shield designs are still prone to failure.

SUMMARY

In one aspect, an annular seal for sealing a flow includes an inner ring and a tab. The tab extends radially and is configured to restrict axial movement of the seal.

In another aspect, a seal assembly includes a first component, a second component, a first seal, and a second seal. The first component has a first shelf. The second component is adjacent to the first component and forms a cavity between the first and second components. The second component includes a second shelf, which, together with the first shelf, forms a restricted flow channel. The first seal spans the cavity. The second seal is located entirely radially inward of the first seal, and seals the restricted flow channel. The second seal includes a tab that extends radially to restrict axial movement of the second seal.

In another aspect, a method of forming a seal includes sealing a cavity formed between a first component and a second component using a first seal. The first seal seals against a radial surface of the first component and a radial surface of the second component. A restricted flow channel is formed with a first shelf of the first component and a second shelf of the second component. The restricted flow channel is sealed by with a second seal. The tab restricts axial movement of the first seal.

The present summary is provided only by way of example, and not limitation. Other aspects of the present invention will be appreciated in view of the entirety of the present disclosure, including the entire text, claims and accompanying figures.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Heat shields and wear shields (or secondary seals) reduce high temperature exposure to and wear on primary seals (e.g., w-seals); however, prior art heat shield and wear shield designs that rely on secondary seals being resilient are prone to failure. Other prior art heat shield designs include heat shields that contact the w-seal near where the w-seal seals against a surface, causing potential wear on the w-seal and creating a potential for the seal to be compromised. Yet other prior art heat shields seal against one cavity wall and one axial surface of the w-seal, creating an additional leak-path and causing potential run-off and wear of the inboard convolution on the opposite end of the w-seal. The seal assembly invention prolongs the life of w-seals by adding a self-centering split ring seal that protects the w-seal from high temperatures and harsh wear surfaces and from escaping either inboard or outboard.

Figure 1:
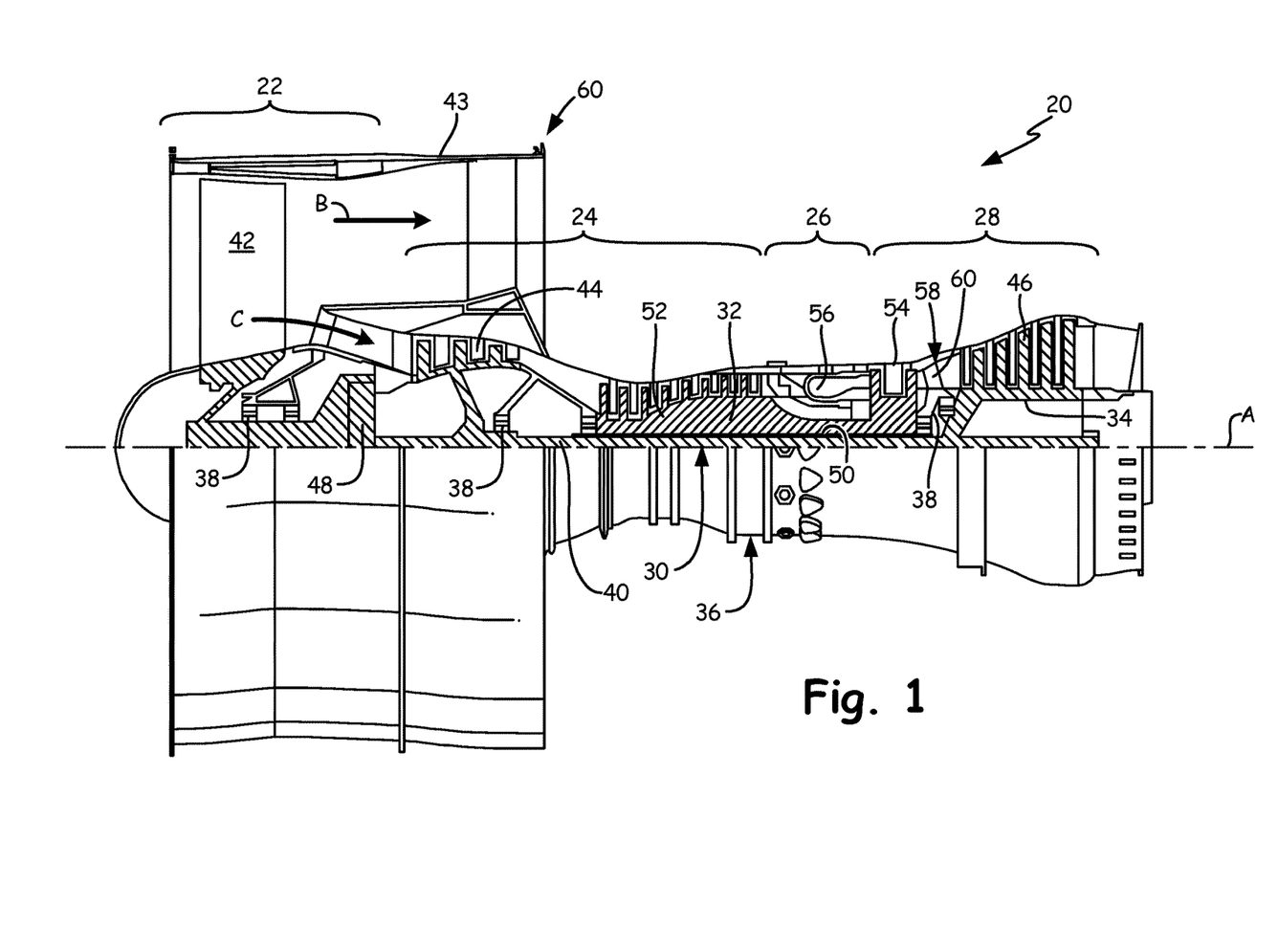
FIG. 1 is a quarter-sectional view of a gas turbine engine.

FIG. 1 is a quarter-sectional view of gas turbine engine 20 that includes fan section 22, compressor section 24, combustor section 26, and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor (HPC) 52 and high pressure turbine 54. In one example, high pressure turbine 54 includes at least two stages to provide a double stage high pressure turbine 54. In another example, high pressure turbine (HPT) 54 includes only a single stage. As used herein, a "high pressure" compressor or turbine experiences a higher pressure than a corresponding "low pressure" compressor or turbine.

The example low pressure turbine (LPT) 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 is arranged generally between high pressure turbine 54 and low pressure turbine 46. Mid-turbine frame 58 further supports bearing systems 38 in turbine section 28 as well as setting airflow entering low pressure turbine 46.

The core airflow C is compressed by low pressure compressor 44 then by high pressure compressor 52 mixed with fuel and ignited in combustor 56 to produce high speed exhaust gases that are then expanded through high pressure turbine 54 and low pressure turbine 46. Mid-turbine frame 58 includes airfoils/vanes 60, which are in the core airflow path and function as an inlet guide vane for low pressure turbine 46. Utilizing vanes 60 of mid-turbine frame 58 as inlet guide vanes for low pressure turbine 46 decreases the length of low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

Figure 2:
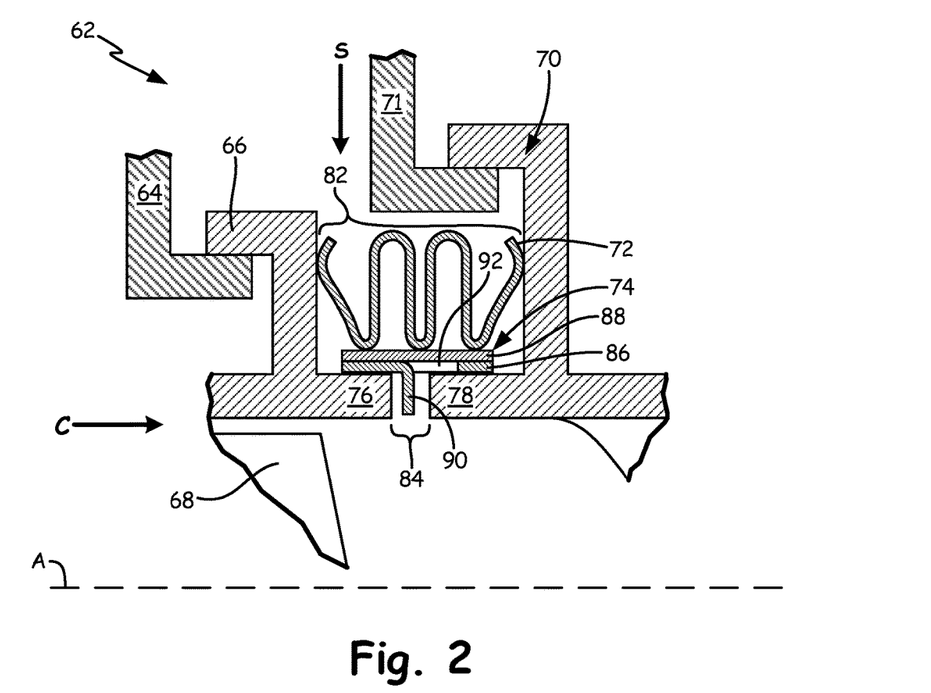
FIG. 2 is a cross-sectional view of a seal assembly.

FIG. 2 is a cross-sectional view of seal assembly 62, which can be located in high pressure turbine 54 of FIG. 1. Seal assembly 62 includes blade outer air seal (BOAS) support 64, BOAS 66, blade 68, vane 70, vane support 71, w-seal 72, seal ring 74, first shelf 76, second shelf 78, cavity 82, and restricted flow channel 84. Seal ring 74 includes inner ring 86, outer ring 88, tab 90, and notch 92. Also shown in FIG. 2 are core flow path C, secondary flow S, and a representative engine central longitudinal axis A.

In the illustrated embodiment, BOAS support 64 is a rigid static component of gas turbine engine 20 that supports BOAS 66. BOAS 66 does not rotate, but is not entirely static, as BOAS 66 can shift radially and axially. Moreover, it should be understood that a "static" component in the present context can be installed in an engine of a movable vehicle. BOAS 66 forms a seal for blade 68. Because blade 68 rotates within BOAS 66, a gap must be maintained between BOAS 66 and blade 68 to enable rotation of blade 68. This gap is known in the art as blade tip clearance. Vane 70 is also a non-rotating component, but is supported by vane support 71. Vane 70 is located downstream of BOAS support 64 and BOAS 66, relative to core flow path C.

BOAS 66 includes first shelf 76 which extends axially aft from BOAS 66 towards vane 70, but stopping short of contacting vane 70. Vane 70 includes second shelf 78, which extends axially fore from vane 70 towards BOAS 66, but in the illustrated position terminates prior to contacting first shelf 76. First shelf 76 and second shelf 78 form restricted flow channel 84, which is fluidly connected to core flow path C and continues radially outward, connecting to cavity 82. BOAS 66, vane 70, first shelf 76, second shelf 78, and vane support 71 form cavity 82, which can receive secondary flow S, which is a cooling and pressurization flow, from a source such as HPC 52 (of FIG. 1), on the radially outward portion of cavity 82.

W-seal 72 is a resilient annular w-type seal having two axially outer arms for contacting surfaces to form a seal. W-seal 72 also has multiple convolutions that provide resiliency and allow w-seal to conform to openings of varying sizes. In other embodiments, w-seal 72 can be a different type of annular seal such as a finger seal or dog-bone seal. W-seal 72 spans cavity 82 contacting radially extending surfaces of BOAS 66 and vane 70. The radially inner convolutions of w-seal 72 contact a surface of seal ring 74 (e.g., a radially outer surface of seal ring 74).

Seal ring 74 is a split ring annular seal made of a thin (e.g., 0.005 to 0.020 inches [0.125 to 0.5 mm]) sheet metal having a high temperature resistance, and a low coefficient of friction, such as a cobalt alloy. Seal ring 74 can be made of other materials in other embodiments. Seal ring 74 includes inner ring 86 and outer ring 88, which are both circumferentially split seal rings, wherein inner ring 86 is nested within outer ring 88. The circumferential splits of inner ring 86 and outer ring 88 are circumferentially spaced apart, or clocked, and are (largely or generally) restrained from circumferential movement by friction, but can be restrained in other ways, as discussed below. Inner ring 86 has a linear cross-sectional profile, apart from tab 90, and outer ring 88 has a linear cross-sectional profile. However, inner ring 86 and outer ring 88 can have other cross-sectional profiles in further embodiments.

Tab 90 is a radially extending or projecting portion of inner ring 86, which extends radially inward and away from w-seal 72 in the illustrated embodiment. Tab 90 can be formed of inner ring 86 by a punch or similar manufacturing process, which creates both tab 90 and notch 92. In other embodiments, tab 90 can be an additional piece that is attached to inner ring 86. Seal ring 74 can include multiples of tab 90, as discussed further below.

Seal ring 74 is positioned to rest on surfaces of first shelf 76 and second shelf 78 (e.g., on radially outer surfaces of first shelf 76 and second shelf 78). Tab 90 is inserted into restricted flow channel 84, which limits axial movement of seal ring 74 and helps center seal ring 74 relative to cavity 82. Seal ring 74 can be of an axial length so that seal ring 74 does not contact radially facing surfaces of BOAS 66 and vane 70.

W-seal 72 forms a seal in cavity 82 that limits fluid flow between restricted flow channel 84 and cavity 82. Further, seal ring 74 creates a seal in restricted flow channel 84 at first shelf 76 and second shelf 78, further preventing restricted flow channel 84 from fluidly connecting to cavity 82.

At initial start-up of gas turbine engine 20, a radially inward force is created by secondary flow S that forces BOAS 66 and vane 70 radially toward core airflow C (e.g. inward) until BOAS 66 is seated on BOAS support 64 and vane 70 is seated on vane support 71. The pressure differential also forces w-seal 72 to move radially until w-seal 72 contacts seal ring 74, applying radial pressure on seal ring 74. During operation, w-seal 72 applies pressure on seal ring 74, causing seal ring 74 to seal restricted flow channel 84.

Specifically, inner ring 86 blocks the passage of gas from core flow path C. Also, outer ring 88 prevents the passage of gas through notch 92 of inner ring 86, and circumferential splits of inner ring 86 and outer ring 88, forming a complete seal of restricted flow channel 84. By sealing restricted flow channel 84, seal ring 74 thermally protects w-seal 72 from core flow path C by blocking the passage of air from core flow path C and by preventing radiation heat transfer. Seal ring 74 also protects w-seal 72 from debris from core flow path C. Because w-seal 72 is thermally protected, w-seal 72 can be made of a material having a higher strength than a w-seal that is exposed to core flow path C, increasing the longevity of w-seal 72. Seal ring 74 also serves as a secondary seal in the case of a failure of w-seal 72.

Tab 90 extends radially inward into restricted flow channel 84, but typically does not extend past restricted flow channel 84. Tab 90 can have an axially thickness that is smaller than an axial length of restricted flow channel 84 during non-operation and most operational conditions. This allows tab 90 to move axially within restricted flow channel 84. Accordingly, seal ring 74 can also move axially. However, the axial movement of tab 90 and therefore seal ring 74 is restricted by contact of tab 90 with first shelf 76 and/or second shelf 78. This keeps seal ring 74 roughly centered within cavity 82 and roughly centered about restricted flow channel 84, which has several benefits. In some embodiments, first shelf 76 and second shelf 78 can have axial lengths and tab 90 can have an axial thickness so that tab 90 can move within restricted flow channel 84 such that seal ring 74 can move axially along first shelf 76 and second shelf 78, but so that seal ring 74 cannot contact radially extending surfaces of BOAS 66 and vane 70, which reduces biding and lifting of seal ring 74.

Because seal ring 74 has restrained axial movement, seal ring 74 maintains a seal of restricted flow path 84. Additionally, restricting axial movement of seal ring 74 reduces wear on w-seal 72 by providing a consistent surface for contact with the radially inner convolutions of w-seal 72 (which are not sealing surfaces of w-seal 72 in the illustrated embodiment). In other embodiments, a wear coating can be added to the radially outer surface of seal ring 74 to further enhance wear resistance of the W seal.

Further, restricted flow channel 84 and w-seal 72 can be sized to help prevent liberation of seal ring 74. When pressure loads of operation are absent, w-seal 72 can move radially allowing seal ring 74 to move radially and axially. This has been problematic in some prior art seal assemblies, because secondary seals can sometimes liberate without pressure loads provided by secondary flow S. The present invention solves this problem in several ways. First, in one embodiment, because vane support 71, first shelf 76, and second shelf 78 restrict radial movement of w-seal 72, w-seal 72 cannot move far enough radially to allow tab 90 to move out of restricted flow channel 84, preventing liberation of seal ring 74 into core flow path C. In embodiments where w-seal 72 does allow tab 90 to move out of restricted flow channel 84, tab 90 prevents liberation of seal ring 74 by preventing seal ring 74 from passing through restricted flow channel 84 when seal ring 74 is turned 90° from its position shown in FIG. 2. Tab 90 prevents liberation at the 90° turned position of seal ring 74 by tab 90 being axially longer (when turned 90° from the illustrated position) than restricted flow channel 84 at all operating conditions. Also, seal ring 74 is less likely to deteriorate because seal ring 74 need not be resilient and therefore can be made of a metal having a high temperature resistance, increasing component life of seal ring 74 and further decreasing the possibility of seal ring 74 entering core flow path C.

Some secondary seals (e.g. L-shaped heat shields) interact with the seal formed by (primary) w-seals and adjacent surfaces, creating an additional leak path. Seal ring 74 does not interfere with sealing contact between w-seal 72 and the radially extending surfaces of BOAS 66 and vane 70, reducing leakage past w-seal 72 and seal ring 74.

In some prior art, w-seals are designed to contact shelves or other stepped or uneven surfaces. This design can cause significant wear on radially inner convolutions of w-seals. Seal ring 74 reduces wear on w-seal 72 by providing a relatively flat contact surface to engage with w-seal 72. Additionally, because seal ring 74 has a low coefficient of friction, seal ring 74 encounters less damage when sliding on first shelf 76 and second shelf 78. Similarly, because seal ring 74 has a low coefficient of friction, damage incurred by w-seal 72 due to sliding on seal ring 74 is reduced by the low coefficient of friction of seal ring 74.

Seal assembly 62 can be used in other areas of the gas turbine engine, such as turbine section 28. Additionally, seal ring 74 can be used to form seals between components of gas turbine engine 20 other than blades and vanes. Further, seal ring 74 can be used in applications other than for gas turbine engines, such as pumps having annular housings.

Figure 3A:
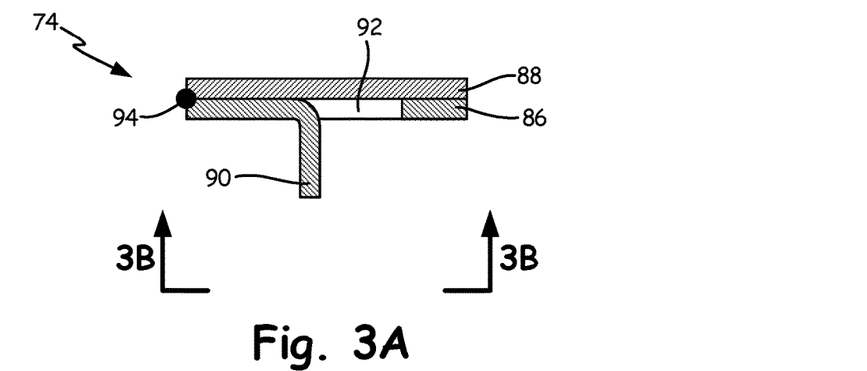
FIG. 3A is a cross-sectional view of a seal ring.
Figure 3B:
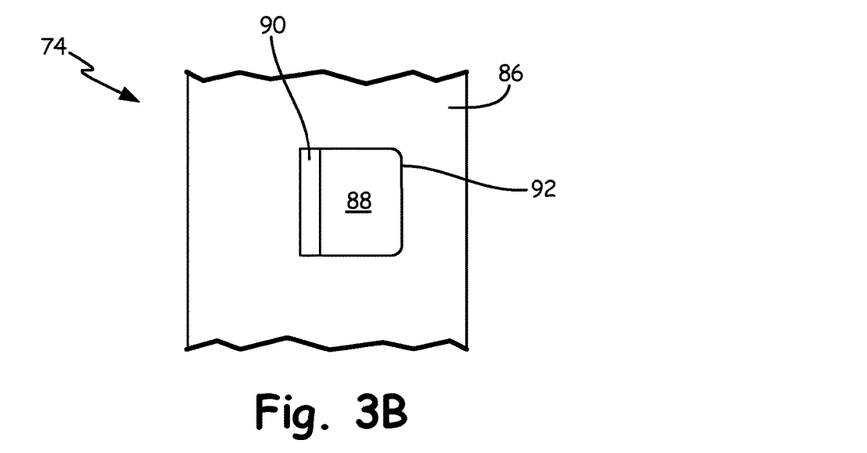
FIG. 3B is a plan view of a portion of the seal ring of FIG. 3A.

FIG. 3A is a cross-sectional view of seal ring 74 and FIG. 3B is a plan view of a portion of seal ring 74 from perspective 3B-3B of FIG. 3A. Seal ring 74 includes inner ring 86, outer ring 88, tab 90, notch 92, and spot weld 94 (shown in FIG. 3A).

Spot weld 94 is located where axially extending surfaces of inner ring 86 and outer ring 88 meet at axial ends of inner ring 86 and outer ring 88. Spot weld 94 holds outer ring 88 and inner ring 86 together, ensuring that outer ring 88 seals notch 92, preventing gas from core flow path C (of FIGS. 1 and 2) from bypassing seal ring 74. Weld 94 also ensures that circumferential gaps in inner ring 86 and outer ring 88 stay correctly clocked (circumferentially spaced) from each other, as discussed below.

Tab 90 can be formed from inner ring 86 so that tab 90 is slightly axially off-center. In other embodiments (especially in embodiments where tab 90 is not formed from inner ring 86), tab 90 can have any axial location along inner ring 86.

Figure 4:
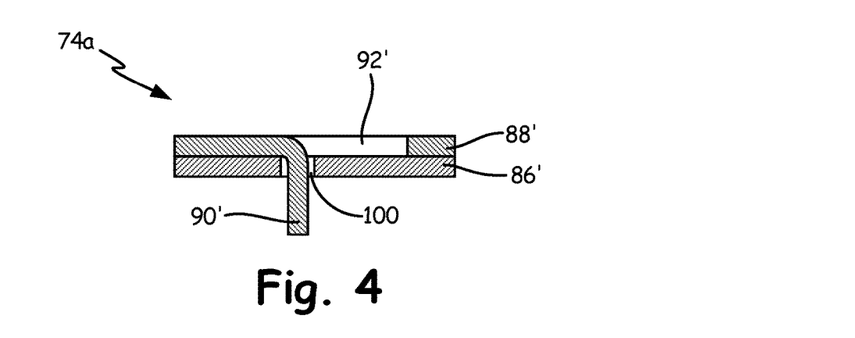
FIG. 4 is a cross-sectional view of another embodiment of a seal ring.
Figure 5:
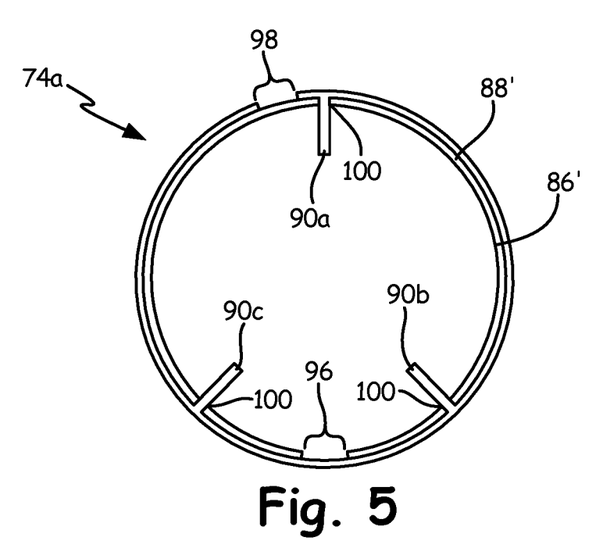
FIG. 5 is an elevation view of the seal ring of FIG. 4.

FIG. 4 is a cross-sectional view of seal ring 74a and FIG. 5 is an elevation view of seal ring 74a, which includes inner ring 86', outer ring 88', tab 90' (illustrated as tabs 90a-90c in FIG. 5), notch 92', inner gap 96, outer gap 98, and second notch 100.

Seal ring 74a is generally similar to seal ring 74 described above with respect to FIGS. 2, 3A, and 3B, except that notch 92' of seal ring 74a is formed of outer ring 88' and extends through second notch 100 of inner ring 86'. Second notch 100 can be axially shorter than notch 92' (as well as notch 92).

Tab 90' provides the functions and benefits described in FIGS. 2 and 3. In addition, tab 90' and second notch 100 of seal ring 74a help prevent inner ring 86' from rotating relative to outer ring 88', maintaining the clocking or spacing of inner ring 86' and outer ring 88', which is important for preventing gasses from core flow path C from passing through circumferential splits in inner ring 86' and outer ring 88'. Because tab 90' and second notch 100 help prevent relative movement of inner ring 86' and outer ring 88', welding of inner ring 86' to outer ring 88' is not required, saving cost.

Inner gap 96 is a circumferential gap in inner ring 86 that allows inner ring to expand and contract during operation of gas turbine engine 20. Similarly, outer gap 98 is a circumferential gap in outer ring 88' that allows outer ring 98 to expand and contract. In one embodiment, inner gap 96 and outer gap 98 can be spaced about 175 degrees. This spacing minimizes gas from core air flow C passing through inner gap 96 and outer gap 98, thus maintaining a seal of restricted flow channel 84.

Tabs 90a-90c are connected to inner ring 86', consistent with the connection of tab 90' to inner ring 86' discussed above. FIG. 5 shows how three of tabs 90' (tabs 90a-90c) can be circumferentially arranged about inner ring 86'. In other embodiments, there can be fewer or more tabs.

Tabs 90a-90c can be equally circumferentially spaced from each other. In the illustrated embodiment, tab 90a is approximately 175 degrees from inner gap 96. Tabs 90b and 90c are each spaced approximately 35 degrees from inner gap 96. This spacing minimizes bypass gas through notch 92', second notch 100 and outer split 98. Tabs 90a-90c can be spaced differently (e.g., unequally) in other embodiments.

Figure 6:
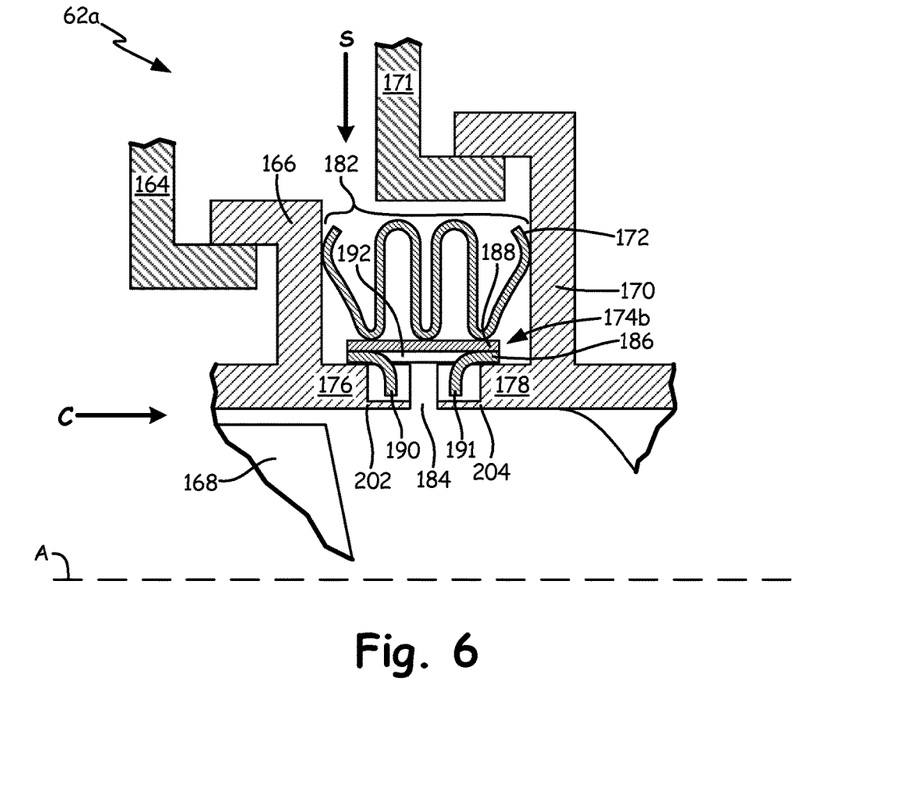
FIG. 6 is a cross-sectional view of another embodiment of a seal assembly.

FIG. 6 is a cross-sectional view of seal assembly 62a, which includes BOAS support 164, BOAS 166, blade 168, vane 170, vane support 171, w-seal 172, seal ring 174, first shelf 176, second shelf 178, cavity 182, and restricted flow channel 184. Seal ring 174 includes inner ring 186, outer ring 188, tab 190, second tab 191, notch 192, fore slot 202, and aft slot 204. Also shown in FIG. 6 are core flow path C, secondary flow S, and a representative engine central longitudinal axis A.

Fore slot 202 is a cavity in first shelf 176 that is open on a side facing seal ring 174, but does not pass entirely through first shelf 176 in a radial direction (fore slot 202 is closed to core flow path C). Fore slot 202 has axial and circumferential lengths that are larger than corresponding dimensions of tab 190 by an amount sufficient to allow seal ring 174 to expand and contract and move with w-seal 172. Similarly, slot 204 is a cavity in second shelf 178 that is open on a side facing seal ring 174, but does not pass entirely through first shelf 176 in a radial direction (aft slot 204 is closed to core flow path C). Aft slot 204 has axial and circumferential lengths that are larger than corresponding dimensions of second tab 191 by an amount sufficient to allow seal ring 174 to expand and contract and move with w-seal 172. Though fore slot 202 and aft slot 204 are closed to core flow path C, fore slot 202 and aft slot 204 can be through-slots that are open to core flow path C in other embodiments.

Seal assembly 62a is similar to that of previous embodiments, except for that first shelf 176 includes first slot 202, second shelf 178 includes second slot 204, and seal ring 174 includes second tab 191.

Tabs 190 and 191 can both be formed from inner ring 186, creating notch 192. Both of tabs 190 and 191 extend radially from inner ring 186. In the illustrated embodiment, tab 190 extends radially inward into first slot 202 and second tab 91 extends radially inward into second slot 204. Tab 190 is restrained from moving freely axially and circumferentially by first slot 202. Similarly, second tab 191 is restrained from moving freely axially and circumferentially by second slot 204. This means seal ring 174 is restrained from moving.

Many turbine engines use vanes and blades that are segmented circumferentially. Annular seals that engage segmented components are subject to inconsistent circumferential surfaces that cause nonuniform deformations and wear patterns over the circumference of the annular seal. These deformations seal well against components that form the deformations. However, these deformations in seals sometimes do not prevent fluid passage when interacting with different segments having dissimilar profiles (segments that did not create the deformation). That is, when a deformation of a seal aligns with a surface lacking the same deformation, or having a different deformation, this can result in leaks of gas from core air flow C. Because seal ring 174 cannot rotate circumferentially, any nonuniform circumferential deformations that occur in seal ring 174 remain aligned with the components, such as vane 170, that caused the deformations, maintaining a seal of restricted flow channel 184.

Additionally, because tab 190 is not inserted into restricted flow channel 184, restricted flow channel 184 can be of a reduced axial length, which increases pressure drop through restricted flow channel 184, therefore decreasing the potential flow rate of gas from core air flow C through restricted flow channel 184, should a leak form in seal ring 174.

In other embodiments, there can be only tab 190 and first slot 202 and not second tab 191 and not second slot 204, which can save cost. Moreover fore slot 2022 and/or aft slot 204 can be utilized with other embodiments, such as those described above.

Figure 7A:
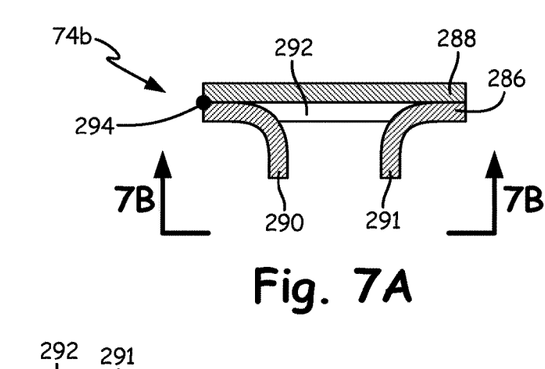
FIG. 7A is a cross-sectional view of the seal ring of the seal assembly of FIG. 6.
Figure 7B:
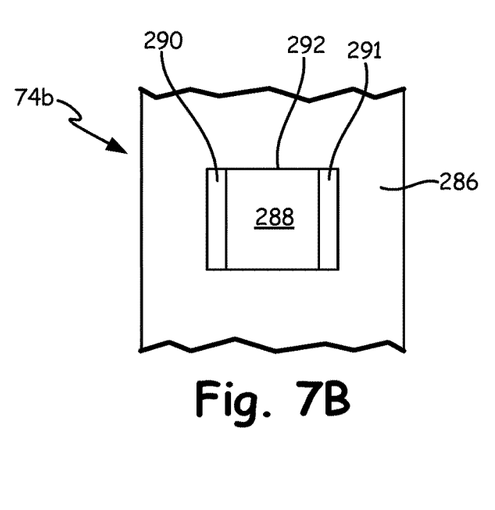
FIG. 7B is a plan view of an embodiment of the seal ring of FIG. 7A.

FIG. 7A is a cross-sectional view of seal ring 74b and FIG. 7B is a plan view of seal ring 74b. Seal ring 74b includes inner ring 286, outer ring 288, tab 290, second tab 291, notch 292, and spot weld 294 (illustrated in FIG. 7A).

Seal ring 74b is similar to seal ring 74 except that seal ring 74b includes second notch 291, which extends radially. This results in notch 292 being larger than notch 92 of previously described embodiments.

Figure 8:
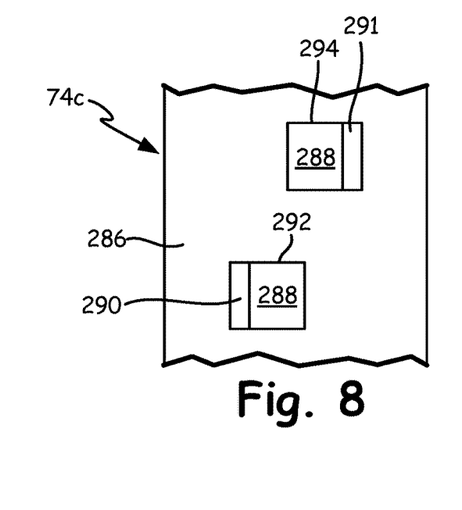
FIG. 8 is a plan view of another embodiment of a seal ring.

FIG. 8 is a plan view of seal ring 74c, which includes inner ring 286, outer ring 288, tab 290, second tab 291, notch 292, and second notch 293.

Seal ring 74c differs in that tab 290 and second tab 291 are circumferentially spaced from each other and are associated with different notches. Second tab 291 therefore creates second notch 293 while tab 290 is at notch 292. Tab 290 and second tab 291 can be axially offset, as illustrated in FIG. 8. Tabs 290 and 291 can also be on different axial sides of notches, as illustrated in FIG. 8.

The circumferential offset of tab 290 and second tab 291 of seal ring 74c provides the benefits of preventing circumferential rotation of seal, while including smaller notches, notch 292 and second notch 294. This can increase longevity of seal ring 74c by reducing the risk of failure at notch 292 or second notch 293.

Figure 9:
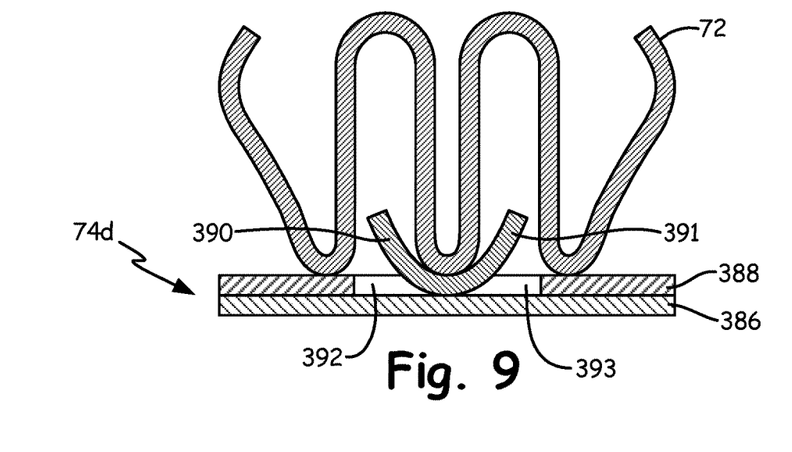
FIG. 9 is a cross-sectional view of another embodiment of a seal ring.

FIG. 9 is a cross-sectional view of seal ring 74d. Seal ring 74d includes inner ring 386, outer ring 388, tab 390, second tab 391, notch 392, and second notch 393. FIG. 9 also shows w-seal 72. Tab 390 and second tab 391 collectively form a curved u-shape structure, facing radially outward (but can face radially inward in other embodiments).

Seal ring 74d differs from previously-described embodiments in that tab 390 and second tab 391 extend from outer ring 388, radially outward, to engage an inner (or middle) convolution of w-seal 72. This creates notch 390 and second notch 392 in outer ring 388.

In operation, w-seal 72 restricts axial movement of tab 390 and second tab 392 and therefore axial movement of seal ring 74d. This can reduce wear of w-seal 72 and seal ring 74.

Other embodiments can include additional tabs, and can engage different convolutions of w-seal 74 (e.g. a fore convolution), and can engage multiple convolutions of w-seal 72. Though tab 390 and second tab 391 are shown in circumferential alignment, tab 290 and second tab 391 can be circumferentially spaced (or offset) from each other.

Figure 10:
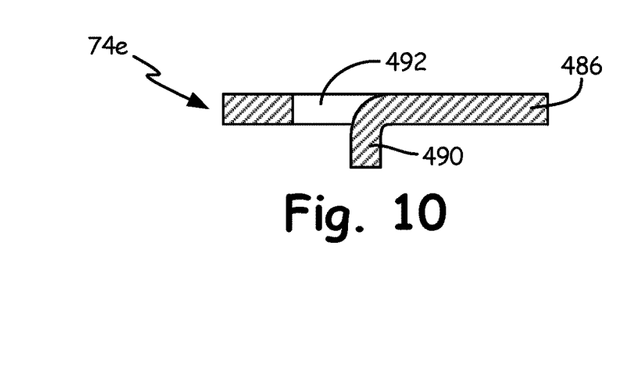
FIG. 10 is a cross-sectional view of another embodiment of a seal ring.

FIG. 10 is a cross-sectional view of seal ring 74e, which includes ring 486, tab 490, and notch 492. Seal ring 74e differs from previously-described embodiments in that it includes only one ring, which can save cost.

Figure 11:
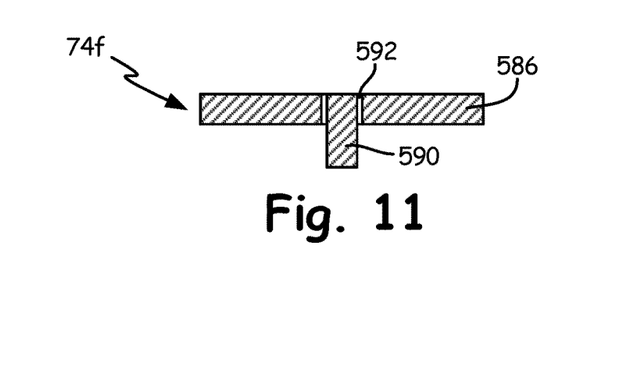
FIG. 11 is a cross-sectional view of another embodiment of a seal ring.

FIG. 11 is a cross-sectional view of seal ring 74f, which includes ring 586, tab 590, and notch 592. Seal ring 74d differs from previously-described embodiments in that tab 590 is welded into notch 592, sealing notch 592. Because notch 592 is sealed by tab 590, tab 590 reduces leakage through seal ring 74c.

Tab 590 can be attached to ring 586 in many ways in further embodiments. For example: tab 590 can thread into or onto ring 586; tab 590 can be adhered or swaged to ring 586, or tab 590 can be brazed onto ring 586.

DISCUSSION OF POSSIBLE EMBODIMENTS

The following are non-exclusive descriptions of possible embodiments of the present invention.

An annular seal for sealing a flow in a gas turbine engine includes an inner ring, and a tab. The tab extends radially and is configured to restrict axial movement of the seal.

The seal of the preceding paragraph can optionally include, additionally and/or alternatively, any one or more of the following features, configurations, and/or additional components.

An outer ring can be located radially outward of the inner ring, and can have an outer circumferential split defining an outer gap. The inner ring can have an inner circumferential split defining an inner gap that is spaced away from the outer gap.

The outer ring can have a cross sectional profile that is linear.

The tab can formed of a portion of the outer ring and can extend radially inward, passing through a notch in the inner ring.

A seal assembly includes a first component, a second component, a first seal, and a second seal. The first component has a first shelf. The second component is adjacent to the first component and forms a cavity between the first and second components. The second component includes a second shelf, which, together with the first shelf, forms a restricted flow channel. The first seal spans the cavity. The second seal is located entirely radially inward of the first seal, and seals the restricted flow channel. The second seal includes a tab that extends radially to restrict axial movement of the second seal.

The seal assembly of the preceding paragraph can optionally include, additionally and/or alternatively, any one or more of the following features, configurations, additional components, and/or steps.

The first seal can be a w-seal, the first component can be a blade outer air seal, and the second component can be a vane.

The first seal can seal against a radial surface of the first component and a radial surface of the second component, and the first seal can contact a radially outer axial surface of the second seal.

The second seal can include an inner ring having an inner circumferential split defining an inner gap and an outer ring having an outer circumferential split defining an outer gap.

The tab can extend radially inward from the outer ring through a slot in the inner ring.

The inner gap and the outer gap can be circumferentially offset by about 175 degrees.

The outer ring can include a second tab and a third tab extending radially inward from the second seal.

A first tab can be circumferentially spaced about 175 degrees from the outer gap. The second tab and third tab can be located on opposite sides of the outer gap. The second tab and the third tab can be each circumferentially spaced about 35 degrees from the outer gap.

The inner ring and outer ring can be welded together.

The tab can extend into the restricted flow channel.

A slot in the first shelf can be adjacent to the restricted flow channel, where the slot can receive the first tab.

The inner ring can include a second tab that extends radially inward into the restricted flow channel.

The first tab and the second tab can be circumferentially aligned.

A first slot in the first shelf can be adjacent to the restricted flow channel that receives the first tab. A second slot in the second shelf can be adjacent to the restricted flow channel that receives a second tab.

A second tab can extend radially outward to engage the first seal. The first tab can extend radially outward to engage the first seal. The first tab and the second tab can restrict axial movement of the first seal relative to the second seal.

A method of forming a seal includes sealing a cavity formed between a first component and a second component using a first seal. The first seal seals against a radial surface of the first component and a radial surface of the second component. A restricted flow channel is formed with a first shelf of the first component and a second shelf of the second component. The restricted flow channel is sealed by a second seal. The tab restricts axial movement of the first seal.

The method of the preceding paragraph can optionally include, additionally and/or alternatively, any one or more of the following features, configurations, additional components, and/or steps.

The tab can be inserted into the restricted flow channel, and the first seal can contact a radially outer surface of the second seal.

Any relative terms or terms of degree used herein, such as "substantially", "essentially", "generally", "approximately", "about" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims. For instance, seals and seal assemblies described with respect to embodiments at locations radially outward from a hot gas flow can be readily applied to locations radially inward from the hot gas flow in further embodiments.

The invention claimed is:

1. A seal assembly comprising:
   a first component having a first shelf;
   a second component adjacent to the first component forming a cavity between the first and second components, the second component comprising:
     a second shelf together with the first shelf forming a restricted flow channel;
   a first seal spanning the cavity;
   a second seal located entirely radially inward of the first seal, and sealing the restricted flow channel, the second seal comprising:
     a first tab that extends radially to restrict axial movement of the second seal; and
     a slot in the first shelf adjacent to the restricted flow channel, wherein the slot receives the first tab.

2. The seal assembly of claim 1, wherein the first seal is a w-seal, wherein the first component is a blade outer air seal, and wherein the second component is a vane.

3. The seal assembly of claim 1, wherein the first seal seals against a radial surface of the first component and a radial surface of the second component, and wherein the first seal contacts a radially outer axial surface of the second seal.

4. The seal assembly of claim 1, wherein the second seal comprises:
   an inner ring having an inner circumferential split defining an inner gap; and
   an outer ring having an outer circumferential split defining an outer gap.

5. The seal assembly of claim 4, wherein the first tab extends radially inward from the outer ring through a slot in the inner ring.

6. The seal assembly of claim 4, wherein the inner gap and the outer gap are circumferentially offset by about 180 degrees.

7. The seal assembly of claim 4, wherein the outer ring comprises a plurality of tabs, and wherein the plurality of tabs comprises the first tab, a second tab, and a third tab extending radially inward from the second seal.

8. The seal assembly of claim 7, wherein the first tab is circumferentially spaced about 175 degrees from the outer gap, wherein the second tab and third tab are located on opposite sides of the outer gap, and wherein the second tab and the third tab are each circumferentially spaced about 35 degrees from the outer gap.

9. The seal assembly of claim 4, wherein the inner ring and outer ring are welded together.

10. The seal assembly of claim 1, wherein the inner ring comprises a plurality of tabs and wherein the plurality of tabs comprises the first tab and a second tab that extend radially inward into the restricted flow channel.

11. The seal assembly of claim 10, wherein the first tab and the second tab are circumferentially aligned.

12. A method of forming a seal, the method comprising:
   sealing a cavity formed between a first component and a second component using a first seal, wherein the first seal spans the cavity and seals against a radial surface of the first component and a radial surface of the second component;
   forming a restricted flow channel with a first shelf of the first component and a second shelf of the second component;
   sealing the restricted flow channel with a second seal by positioning the second seal to rest on radially outer axial surfaces of the first and second shelves wherein the second seal is located entirely radially inward of the first seal; and
   restricting axial movement of the second seal with a first tab that extends radially into the restricted flow channel and is received in a slot in the first shelf adjacent to the restricted flow channel.

13. The method of claim 12 and further comprising:
   inserting the tab into the restricted flow channel, wherein the first seal contacts a radially outer surface of the second seal.

14. A seal assembly comprising:
   a first component having a first shelf;
   a second component adjacent to the first component forming a cavity between the first and second components, the second component comprising:
     a second shelf together with the first shelf forming a restricted flow channel;
   a first seal spanning the cavity; and
   a second seal located entirely radially inward of the first seal, and sealing the restricted flow channel, the second seal comprising:
     a first tab that extends radially to restrict axial movement of the second seal; and
     a second tab;
   a first slot in the first shelf adjacent to the restricted flow channel that receives the first tab; and
   a second slot in the second shelf adjacent to the restricted flow channel that receives the second tab.

15. A seal assembly comprising:
   a first component having a first shelf;
   a second component adjacent to the first component forming a cavity between the first and second components, the second component comprising:
     a second shelf together with the first shelf forming a restricted flow channel;
   a first seal spanning the cavity;
   a second seal located entirely radially inward of the first seal, and sealing the restricted flow channel, the second seal comprising:
     a first tab that extends radially outward to engage the first seal and to restrict axial movement of the second seal; and
     a second tab extending radially outward to engage the first seal; and
   wherein the first tab and the second tab restrict axial movement of the second seal relative to the first seal.

* * * * *